Patented May 5, 1942

2,281,857

UNITED STATES PATENT OFFICE 2,281,857

ETHYL DINITRO SALICYLATE AS AN INSECTICIDE

William Moore, Stamford, Conn., assignor to American Cyanamid Company, New York, N. Y., a corporation of Maine No Drawing. Application June 7, 1940, Serial No. 339,274

5 Claims. (Cl. 167—31)

The present invention relates to an insecticide, and more particularly to a compound which is especially effective as a contact poison for the control of insect pests.

I have discovered that ethyl dinitro salicylate possesses high insecticidal activity against insects which are particularly difficult to exterminate, for example, red spiders, and that such activity is obtained without any substantial harmful or detrimental action on the vegetation infested with the insect.

The following example illustrates a specific method of preparing the above compound in accordance with the invention. Materials employed are in parts by weight.

EXAMPLE

A mixture of 65 parts of dinitro salicylic acid, 60 parts of phosphorus pentachloride and 270 parts of dry ligroin was heated in a vessel under reflux upon a steam bath for five hours. The ligroin was evaporated off and the residue of dinitro salicyl chloride heated on the steam bath under reduced pressure for one hour.

70 parts of dinitro salicyl chloride as prepared above and 160 parts of absolute ethyl alcohol were heated together in a vessel under reflux upon a steam bath for ten hours. On cooling, the reaction material turned to a solid crystalline product. It was recrystallized from 50% ethyl alcohol. The ethyl dinitro salicylate was obtained as a light yellow crystalline material melting at 97° C.

As shown in the following table, the toxicity of ethyl dinitro salicylate greatly exceeds that of the methyl and isoamyl esters of dinitro salicylic acid. Spray solutions were prepared by dissolving the compounds in a solvent medium consisting of 65% acetone and 35% water. The results were obtained under comparable conditions when the sprays were applied to the citrus red spider.

*Table*

| Compound | Dilution | Kill |
|---|---|---|
| | | *Percent* |
| Methyl dinitro salicylate | 1–400 | 50 |
| Ethyl dinitro salicylate | *1–2,000 | 100 |
| Do | 1–4,000 | 96.4 |
| Isoamyl dinitro salicylate | 1–1,250 | 62.7 |

*A 100% kill of the red spider eggs is obtained in conjunction with the 100% kill of the active forms.

This new insecticide may be applied in any of the conventional manners. Thus, for example, it may be used in an aqueous emulsion or it may also be incorporated in organic liquids such as the aliphatic and aromatic hydrocarbons for spraying purposes. It may be effectively used in dusts with such inert solid diluents as kieselguhr, wood flour, walnut shell, talc and the like.

While the invention has been described with particular reference to specific embodiments, it is to be understood that it is not to be limited thereto but is to be construed broadly and restricted solely by the scope of the appended claims.

What I claim is:

1. An insecticidal composition including ethyl dinitro salicylate.

2. An insecticidal composition including ethyl dinitro salicylate incorporated in an organic liquid.

3. An insecticidal composition including ethyl dinitro salicylate incorporated in a solvent medium consisting of 65% acetone and 35% water.

4. An insecticidal composition including ethyl dinitro salicylate incorporated in an aqueous emulsion.

5. An insecticidal composition including ethyl dinitro salicylate incorporated in a dust selected from the group consisting of kieselguhr, wood flour, walnut shell and talc.

WILLIAM MOORE.